US012628136B2

(12) United States Patent (10) Patent No.: US 12,628,136 B2
Suo et al. (45) Date of Patent: May 12, 2026

(54) METHOD AND APPARATUS FOR INTEGRATING WIRELESS COMMUNICATION AND WIRELESS SENSING

(71) Applicant: DATANG MOBILE COMMUNICATIONS EQUIPMENT CO., LTD., Beijing (CN)

(72) Inventors: Shiqiang Suo, Beijing (CN); Qiusha Gong, Beijing (CN); Xin Su, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 367 days.

(21) Appl. No.: 18/261,352

(22) PCT Filed: Dec. 10, 2021

(86) PCT No.: PCT/CN2021/137069
§ 371 (c)(1),
(2) Date: Jul. 13, 2023

(87) PCT Pub. No.: WO2022/156421
PCT Pub. Date: Jul. 28, 2022

(65) Prior Publication Data
US 2024/0089934 A1 Mar. 14, 2024

(30) Foreign Application Priority Data
Jan. 20, 2021 (CN) .......................... 202110076227.4

(51) Int. Cl.
*H04W 72/0446* (2023.01)
(52) U.S. Cl.
CPC .............................. *H04W 72/0446* (2013.01)

(58) Field of Classification Search
CPC .... H04W 72/0446; G01S 7/006; G01S 7/003; G01S 13/765; G01S 7/292; G01S 13/87
(Continued)

(56) References Cited

U.S. PATENT DOCUMENTS

2020/0229102 A1 7/2020 Gubeskys et al.
2021/0286045 A1* 9/2021 Bayesteh ............. H04B 7/0695
(Continued)

FOREIGN PATENT DOCUMENTS

WO 2021/006711 A1 1/2021
WO 2021/180210 A1 9/2021

OTHER PUBLICATIONS

Extended European Search Report issued Jun. 11, 2024 in European Application No. 21920795.8.
(Continued)

*Primary Examiner* — Chi Tang P Cheng
*Assistant Examiner* — Michael Wayne Maddox
(74) *Attorney, Agent, or Firm* — Harness, Dickey & Pierce, P.L.C.

(57) ABSTRACT

Provided are a method and an apparatus for integrating wireless communication and wireless sensing. The method includes: transmitting, by a communication device, a wireless sensing signal in a target slot position related to a switching point between signal transmission and signal reception of a wireless communication signal; and receiving an echo signal corresponding to the wireless sensing signal in the case that a signal transmission slot of the wireless communication signal is ended.

16 Claims, 5 Drawing Sheets

(58) Field of Classification Search
USPC ......................................................... 370/336
See application file for complete search history.

(56) References Cited

U.S. PATENT DOCUMENTS

| | | | |
|---|---|---|---|
| 2023/0188275 A1* | 6/2023 | Ren ....................... | G01S 13/347 |
| | | | 370/329 |
| 2024/0022386 A1* | 1/2024 | Bhamri .................... | H04L 5/14 |

OTHER PUBLICATIONS

Fan Liu et al., "Joint Radar and Communication Design: Applications, State-of-the-Art, and the Road Ahead," IEEE Transations on Communications, vol. 68, No. 6, Feb. 13, 2020.
Notice of Reasons for Refusal issued Aug. 20, 2024 in Japanese Application No. 2023-542767.

* cited by examiner

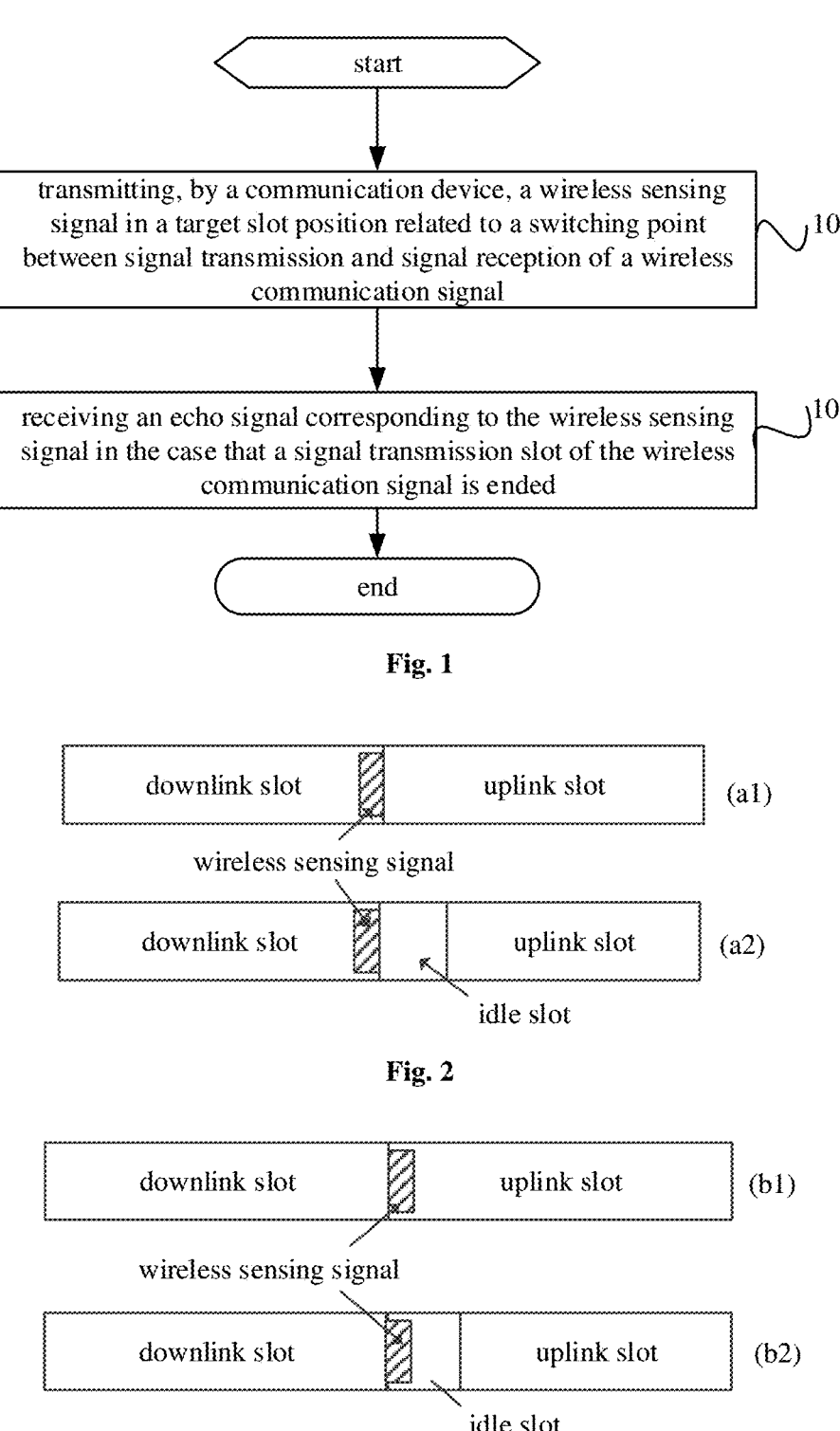

start transmitting, by a communication device, a wireless sensing signal in a target slot position related to a switching point between signal transmission and signal reception of a wireless communication signal ～101 receiving an echo signal corresponding to the wireless sensing signal in the case that a signal transmission slot of the wireless communication signal is ended ～102 end

Fig. 1

| downlink slot | | uplink slot | (a1) | wireless sensing signal

| downlink slot | | uplink slot | (a2) | idle slot

Fig. 2

| downlink slot | | uplink slot | (b1) | wireless sensing signal

| downlink slot | | uplink slot | (b2) | idle slot

METHOD AND APPARATUS FOR INTEGRATING WIRELESS COMMUNICATION AND WIRELESS SENSING

CROSS-REFERENCE TO RELATED APPLICATIONS

This application is the U.S. national phase of PCT Application No. PCT/CN2021/137069 filed on Dec. 10, 2021, which claims a priority of the Chinese patent application No. 202110076227.4 filed on Jan. 20, 2021, disclosures of which are incorporated herein by reference in their entireties.

TECHNICAL FIELD

The present disclosure relates to the field of communication technology, in particular to a method and an apparatus for integrating wireless communication and wireless sensing.

BACKGROUND

Radar-based wireless sensing technology includes two modes, i.e., a passive sensing mode and an active sensing mode. In the passive sensing mode, a sensor obtains electromagnetic waves (e.g., infrared rays) emitted by a target object or reflected by the target object for sensing. In the active sensing mode, the sensor transmits electromagnetic waves and receives the electromagnetic waves reflected by the target object for sensing. A distance between the sensed target object and the sensor is unknown, so the sensor needs to receive a reflected signal corresponding to a sensing signal in real time.

Currently, the integrating between the wireless sensing and the wireless communication mainly in an inter-frequency fusion mode, i.e., the wireless sensing and the wireless communication operate at different operating frequency bands so as to reduce an interference therebetween. Generally, the wireless sensing operates at a high frequency band, while the wireless communication operates at a low frequency band. Along with a decrease in frequency resources, the operating frequency of the wireless communication system becomes higher and higher, and there is an obvious trend for the wireless sensing and the wireless communication to operate at a same frequency band. When the wireless sensing and the wireless communication are simply arranged to operate at a same frequency band, because an echo signal is required to be received in real time in the radar-based wireless sensing technology, a transceiver of the sensor is highly demanded, and the communication system is adversely affected.

SUMMARY

The present disclosure provides a method and an apparatus for integrating wireless communication and wireless sensing, so as to prevent the communication function from being adversely affected after the introduction of the sensing function into a system.

The present disclosure provides in embodiments a method for integrating wireless communication and wireless sensing, including: transmitting, by a communication device, a wireless sensing signal in a target slot position related to a switching point between signal transmission and signal reception of a wireless communication signal; and receiving an echo signal corresponding to the wireless sensing signal in the case that a signal transmission slot of the wireless communication signal is ended.

In a possible embodiment of the present disclosure, the target slot position includes one of: a slot position with a duration of $\tau$ before an end time point of a first slot, the first slot being a last signal transmission slot of the wireless communication signal; a slot position with a duration of $\tau$ after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In a possible embodiment of the present disclosure, in the case that the communication device is a base station, the first slot is a downlink slot, and the second slot is an idle slot or an uplink slot after the last signal transmission slot of the wireless communication signal; and in the case that the communication device is a terminal, the first slot is an uplink slot, and the second slot is an idle slot or a downlink slot after the last signal transmission slot of the wireless communication signal.

In a possible embodiment of the present disclosure, the wireless sensing signal occupies an entire operating frequency band or a part of the operating frequency band corresponding to the target slot position.

In a possible embodiment of the present disclosure, the transmitting the wireless sensing signal in the target slot position related to the switching point between the signal transmission and the signal reception of the wireless communication signal includes transmitting, within a sensing detection period, the wireless sensing signal for N times with a target period, where $N \times T1 < T$, T1 represents the target period and is an integral multiple of a duration of a subframe for transmitting the wireless communication signal, and $\tau$ represents the sensing detection period.

In a possible embodiment of the present disclosure, in the case that the communication device operates in a full duplexing mode, a time for receiving the echo signal corresponding to the wireless sensing signal is $Tr1=T1-\tau$, where Tr1 represents the time for receiving the echo signal, and $\tau$ represents a duration of each transmission of the wireless sensing signal.

In a possible embodiment of the present disclosure, in the case that the communication device operates in a time-division multiplexing mode, a time for receiving the echo signal corresponding to the wireless sensing signal is $Tr2=T1-\tau-Td1-T0$, where Tr2 represents the time for receiving the echo signal, $\tau$ represents a duration of each transmission of the wireless sensing signal, Td1 represents a duration of the signal transmission slot of the wireless communication signal, and T0 represents a switching time between the signal transmission and the signal reception of the wireless communication signal.

In a possible embodiment of the present disclosure, the method further includes: generating a first transmission control signal for transmitting the wireless sensing signal, the first transmission control signal being used to control a first transmission channel to transmit the wireless sensing signal; and in the case that the signal transmission slot of the wireless communication signal is ended, generating a first reception control signal for receiving the echo signal corresponding to the wireless sensing signal, the first reception control signal being used to control a first reception channel to receive the echo signal.

In a possible embodiment of the present disclosure, the transmitting the wireless sensing signal in the target slot position related to the switching point between the signal transmission and the signal reception of the wireless communication signal includes transmitting the wireless sensing signal through the first transmission channel within the target slot position related to the switching point between the signal transmission and the signal reception of the wireless communication signal in accordance with the first transmission control signal. The receiving the echo signal corresponding to the wireless sensing signal in the case that the signal transmission slot of the wireless communication signal is ended includes, in the case that the first reception channel is enabled, receiving the echo signal corresponding to the wireless sensing signal through the first reception channel in accordance with the first reception control signal.

In a possible embodiment of the present disclosure, the method further includes: generating a second transmission control signal for transmitting the wireless communication signal, the second transmission control signal being used to control a second transmission channel to transmit the wireless communication signal; after the transmission of the wireless communication signal, generating a second reception control signal for receiving the wireless communication signal, the second reception control signal being used to control a second reception channel to receive the wireless communication signal; before the transmission of the wireless sensing signal, generating a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generating a third reception control signal for receiving the echo signal corresponding to the wireless sensing signal, the third reception control signal being used to control a third reception channel to receive the echo signal.

In a possible embodiment of the present disclosure, the method further includes: in the case that the second transmission channel is enabled, transmitting the wireless communication signal through the second transmission channel in accordance with the second transmission control signal; and in the case that the second reception channel is enabled, receiving the wireless communication signal through the second reception channel in accordance with the second reception control signal.

In a possible embodiment of the present disclosure, the transmitting the wireless sensing signal in the target slot position related to the switching point between the signal transmission and the signal reception of the wireless communication signal includes, in the case that the third transmission channel is enabled, transmitting the wireless sensing signal through the third transmission channel within the target slot position related to the switching point between the signal transmission and the signal reception of the wireless communication signal in accordance with the third transmission control signal. The receiving the echo signal corresponding to the wireless sensing signal in the case that the signal transmission slot of the wireless communication signal is ended includes, in the case that the third reception channel is enabled, receiving the echo signal corresponding to the wireless sensing signal through the third reception channel in accordance with the third reception control signal.

In a possible embodiment of the present disclosure, prior to transmitting the wireless sensing signal in the target slot position related to the switching point between the signal transmission and the signal reception of the wireless communication signal, the method further includes generating the wireless sensing signal.

In a possible embodiment of the present disclosure, prior to transmitting the wireless sensing signal in the target slot position related to the switching point between the signal transmission and the signal reception of the wireless communication signal, the method further includes generating the wireless communication signal.

In another aspect, the present disclosure provides in some embodiments an apparatus for integrating wireless communication and wireless sensing, including a transceiver, a memory, a processor, and a computer program stored in the memory and executed by the processor. The processor is configured to execute the computer program, so as to: transmit a wireless sensing signal in a target slot position related to a switching point between signal transmission and signal reception of a wireless communication signal; and receive an echo signal corresponding to the wireless sensing signal in the case that a signal transmission slot of the wireless communication signal is ended.

In a possible embodiment of the present disclosure, the target slot position includes one of: a slot position with a duration of $\tau$ before an end time point of a first slot, the first slot being a last signal transmission slot of the wireless communication signal; a slot position with a duration of $\tau$ after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In a possible embodiment of the present disclosure, in the case that a communication device is a base station, the first slot is a downlink slot, and the second slot is an idle slot or an uplink slot after the last signal transmission slot of the wireless communication signal; and in the case that the communication device is a UE, the first slot is an uplink slot, and the second slot is an idle slot or a downlink slot after the last signal transmission slot of the wireless communication signal.

In a possible embodiment of the present disclosure, the wireless sensing signal occupies an entire operating frequency band or a part of the operating frequency band corresponding to the target slot position.

In a possible embodiment of the present disclosure, the transmitting the wireless sensing signal in the target slot position related to the switching point between the signal transmission and the signal reception of the wireless communication signal includes transmitting, within a sensing detection period, the wireless sensing signal for N times with a target period, where $N \times T1 < T$, T1 represents the target period and is an integral multiple of a duration of a subframe for transmitting the wireless communication signal, and $\tau$ represents the sensing detection period.

In a possible embodiment of the present disclosure, in the case that the communication device operates in a full duplexing mode, a time for receiving the echo signal corresponding to the wireless sensing signal is $Tr1=T1-\tau$, where Tr1 represents the time for receiving the echo signal, and $\tau$ represents a duration of each transmission of the wireless sensing signal.

In a possible embodiment of the present disclosure, in the case that the communication device operates in a time-division multiplexing mode, a time for receiving the echo signal corresponding to the wireless sensing signal is $Tr2=T1-\tau-Td1-T0$, where $Tr2$ represents the time for receiving the echo signal, $\tau$ represents a duration of each transmission of the wireless sensing signal, $Td1$ represents a time of a transmission slot of the wireless communication signal, and $T0$ represents a switching time between the signal transmission and the signal reception of the wireless communication signal.

In a possible embodiment of the present disclosure, the processor is further configured to execute the computer program, so as to: generate a first transmission control signal for transmitting the wireless sensing signal, the first transmission control signal being used to control a first transmission channel to transmit the wireless sensing signal; and in the case that the signal transmission slot of the wireless communication signal is ended, generate a first reception control signal for receiving the echo signal corresponding to the wireless sensing signal, the first reception control signal being used to control a first reception channel to receive the echo signal.

In a possible embodiment of the present disclosure, the transmitting the wireless sensing signal in the target slot position related to the switching point between the signal transmission and the signal reception of the wireless communication signal includes transmitting the wireless sensing signal through the first transmission channel within the target slot position related to the switching point between the signal transmission and the signal reception of the wireless communication signal in accordance with the first transmission control signal. The receiving the echo signal corresponding to the wireless sensing signal in the case that the signal transmission slot of the wireless communication signal is ended includes, in the case that the first reception channel is enabled, receiving the echo signal corresponding to the wireless sensing signal through the first reception channel in accordance with the first reception control signal.

In a possible embodiment of the present disclosure, the processor is further configured to execute the computer program, so as to: generate a second transmission control signal for transmitting the wireless communication signal, the second transmission control signal being used to control a second transmission channel to transmit the wireless communication signal; after the transmission of the wireless communication signal, generate a second reception control signal for receiving the wireless communication signal, the second reception control signal being used to control a second reception channel to receive the wireless communication signal; before the transmission of the wireless sensing signal, generate a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generate a third reception control signal for receiving the echo signal corresponding to the wireless sensing signal, the third reception control signal being used to control a third reception channel to receive the echo signal.

In a possible embodiment of the present disclosure, the processor is further configured to execute the computer program, so as to: in the case that the second transmission channel is enabled, transmit the wireless communication signal through the second transmission channel in accordance with the second transmission control signal; and in the case that the second reception channel is enabled, receive the wireless communication signal through the second reception channel in accordance with the second reception control signal.

In a possible embodiment of the present disclosure, the transmitting the wireless sensing signal in the target slot position related to the switching point between the signal transmission and the signal reception of the wireless communication signal includes, in the case that the third transmission channel is enabled, transmitting the wireless sensing signal through the third transmission channel within the target slot position related to the switching point between the signal transmission and the signal reception of the wireless communication signal in accordance with the third transmission control signal. The receiving the echo signal corresponding to the wireless sensing signal in the case that the signal transmission slot of the wireless communication signal is ended includes, in the case that the third reception channel is enabled, receiving the echo signal corresponding to the wireless sensing signal through the third reception channel in accordance with the third reception control signal.

In a possible embodiment of the present disclosure, prior to transmitting the wireless sensing signal in the target slot position related to the switching point between the signal transmission and the signal reception of the wireless communication signal, the processor is further configured to execute the computer program so as to generate the wireless sensing signal.

In a possible embodiment of the present disclosure, prior to transmitting the wireless sensing signal in the target slot position related to the switching point between the signal transmission and the signal reception of the wireless communication signal, the processor is further configured to execute the computer program so as to generate the wireless communication signal.

In yet another aspect, the present disclosure provides in some embodiments an apparatus for integrating wireless communication and wireless sensing, including a signal transceiver unit configured to transmit a wireless sensing signal in a target slot position related to a switching point between signal transmission and signal reception of a wireless communication signal, and receive an echo signal corresponding to the wireless sensing signal in the case that a signal transmission slot of the wireless communication signal is ended.

In a possible embodiment of the present disclosure, the target slot position includes one of: a slot position with a duration of $\tau$ before an end time point of a first slot, the first slot being a last signal transmission slot of the wireless communication signal; a slot position with a duration of $\tau$ after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In a possible embodiment of the present disclosure, in the case that a communication device is a base station, the first slot is a downlink slot, and the second slot is an idle slot or an uplink slot after the last signal transmission slot of the wireless communication signal; and in the case that the communication device is a terminal, the first slot is an uplink slot, and the second slot is an idle slot or a downlink slot after the last signal transmission slot of the wireless communication signal.

In a possible embodiment of the present disclosure, the wireless sensing signal occupies an entire operating frequency band or a part of the operating frequency band corresponding to the target slot position.

In a possible embodiment of the present disclosure, the signal transceiver unit is specifically configured to transmit, within a sensing detection period, the wireless sensing signal for N times with a target period, where $N \times T1 < T$, T1 represents the target period and is an integral multiple of a duration of a subframe for transmitting the wireless communication signal, and $\tau$ represents the sensing detection period.

In a possible embodiment of the present disclosure, in the case that the communication device operates in a full duplexing mode, a time for receiving the echo signal corresponding to the wireless sensing signal is $Tr1 = T1 - \tau$, where Tr1 represents the time for receiving the echo signal, and $\tau$ represents a duration of each transmission of the wireless sensing signal.

In a possible embodiment of the present disclosure, in the case that the communication device operates in a time-division multiplexing mode, a time for receiving the echo signal corresponding to the wireless sensing signal is $Tr2 = T1 - \tau - Td1 - T0$, where Tr2 represents the time for receiving the echo signal, $\tau$ represents a duration of each transmission of the wireless sensing signal, Td1 represents a duration of the signal transmission slot of the wireless communication signal, and T0 represents a switching time between the signal transmission and the signal reception of the wireless communication signal.

In a possible embodiment of the present disclosure, the device further includes a first signal transceiver controller configured to: generate a first transmission control signal for transmitting the wireless sensing signal, the first transmission control signal being used to control a first transmission channel to transmit the wireless sensing signal; and in the case that the signal transmission slot of the wireless communication signal is ended, generate a first reception control signal for receiving the echo signal corresponding to the wireless sensing signal, the first reception control signal being used to control a first reception channel to receive the echo signal.

In a possible embodiment of the present disclosure, the signal transceiver unit includes a first time-division multiplexing transceiver unit configured to: transmit the wireless sensing signal through the first transmission channel within the target slot position related to the switching point between the signal transmission and the signal reception of the wireless communication signal in accordance with the first transmission control signal; and, in the case that the first reception channel is enabled, receive the echo signal corresponding to the wireless sensing signal through the first reception channel in accordance with the first reception control signal.

In a possible embodiment of the present disclosure, the device further includes a second signal transceiver controller configured to: generate a second transmission control signal for transmitting the wireless communication signal, the second transmission control signal being used to control a second transmission channel to transmit the wireless communication signal; after the transmission of the wireless communication signal, generate a second reception control signal for receiving the wireless communication signal, the second reception control signal being used to control a second reception channel to receive the wireless communication signal; before the transmission of the wireless sensing signal, generate a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generate a third reception control signal for receiving the echo signal corresponding to the wireless sensing signal, the third reception control signal being used to control a third reception channel to receive the echo signal.

In a possible embodiment of the present disclosure, the signal transceiver unit includes a second time-division multiplexing transceiver unit configured to: in the case that the second transmission channel is enabled, transmit the wireless communication signal through the second transmission channel in accordance with the second transmission control signal; and in the case that the second reception channel is enabled, receive the wireless communication signal through the second reception channel in accordance with the second reception control signal.

In a possible embodiment of the present disclosure, the signal transceiver unit further includes a co-frequency co-time full duplexing transceiver unit configured to: in the case that the third transmission channel is enabled, transmit the wireless sensing signal through the third transmission channel within the target slot position related to the switching point between the signal transmission and the signal reception of the wireless communication signal in accordance with the third transmission control signal; and, in the case that the third reception channel is enabled, receive the echo signal corresponding to the wireless sensing signal through the third reception channel in accordance with the third reception control signal.

In a possible embodiment of the present disclosure, the device further includes a wireless sensing signal generation unit configured to generate the wireless sensing signal.

In a possible embodiment of the present disclosure, the device further includes a wireless communication signal generation unit configured to generate the wireless communication signal.

In still yet another aspect, the present disclosure provides in some embodiments a processor-readable storage medium storing therein a computer program. The computer program is executed by a processor so as to implement the above-mentioned method.

The present disclosure has the following beneficial effects. According to the embodiments of the present disclosure, the wireless sensing signal is transmitted during the switching occasion of the transmission and reception of the wireless communication signal, and the echo signal corresponding to the wireless sensing signal is received after the wireless communication signal has been transmitted. As a result, it is able to minimize a mutual influence between the wireless communication signal and the wireless sensing signal in inter-frequency multiplexing, thereby to reduce the requirement on the transceiver.

BRIEF DESCRIPTION OF THE DRAWINGS

FIG. 1 is a flow chart of a method for integrating wireless communication and wireless sensing according to an embodiment of the present disclosure;

FIG. 2 is a schematic view showing a transmission position of a wireless sensing signal when a communication device is a base station according to an embodiment of the present disclosure;

FIG. 3 is another schematic view showing the transmission position of the wireless sensing signal when the communication device is the base station according to an embodiment of the present disclosure;

DETAILED DESCRIPTION

Figures 4, 5, 6, 7:
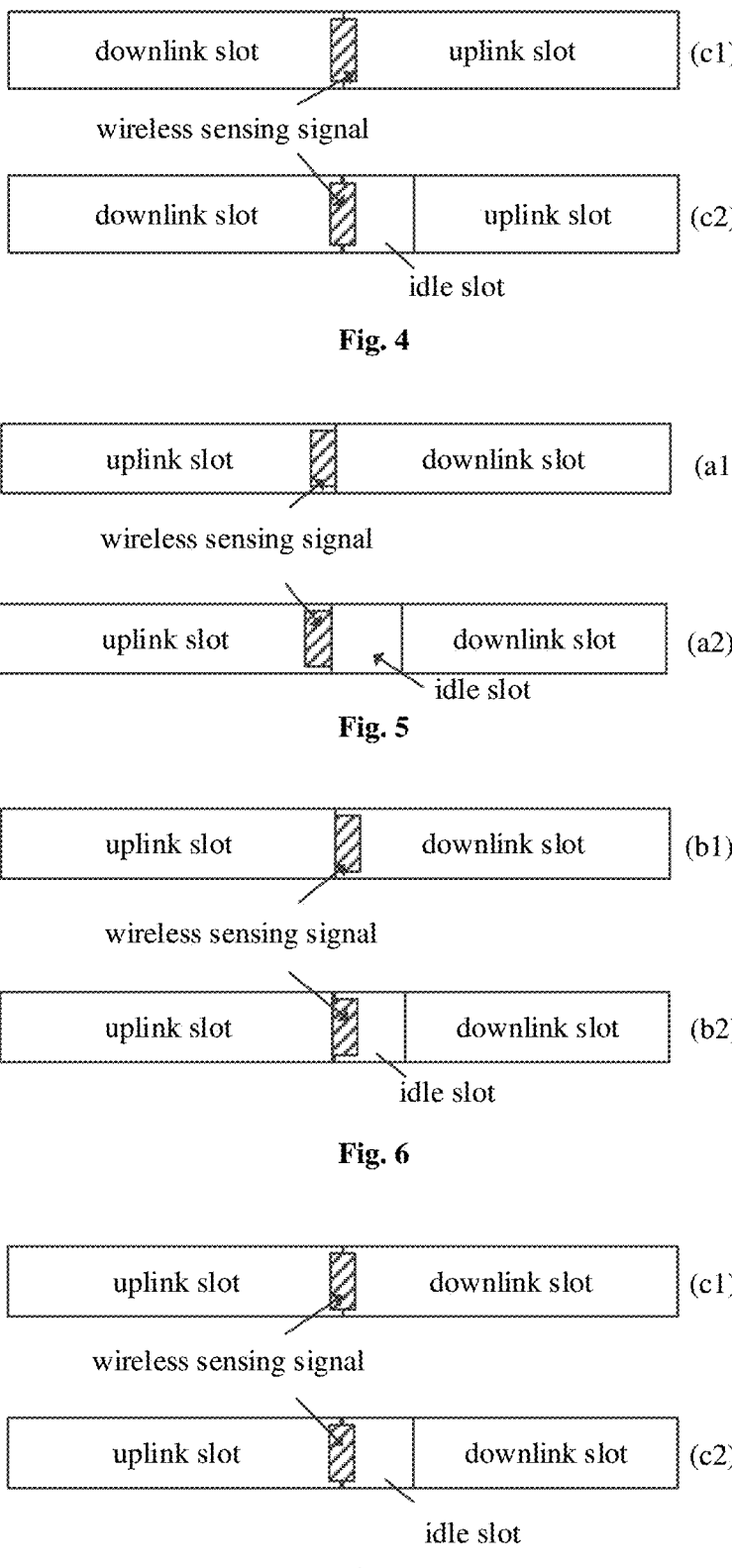
FIG. 4 is yet another schematic view showing the transmission position of the wireless sensing signal when the communication device is the base station according to an embodiment of the present disclosure.
FIG. 5 is a schematic view showing a transmission position of the wireless sensing signal when the communication device is a terminal according to an embodiment of the present disclosure.
FIG. 6 is another schematic view showing the transmission position of the wireless sensing signal when the communication device is the terminal according to an embodiment of the present disclosure.
FIG. 7 is yet another schematic view showing the transmission position of the wireless sensing signal when the communication device is the terminal according to an embodiment of the present disclosure.

In order to make the objective, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

In addition, the terms "system" and "network" may be replaced with each other.

It should be appreciated that, the expression "and/or" is merely used to describe the relationship between objects, and it includes three relationships. For example, "A and/or B" may represent that, there is only A, there are both A and B, and there is only B. Further, the symbol "I" usually refers to "or".

The expression "a plurality of" refers to two or more, and the other quantifiers are similar.

Specifically, embodiments of the present disclosure is to provide a method for integrating wireless communication and wireless sensing, so as to prevent a communication function from being adversely affected after the introduction of a sensing function into a system.

As shown in FIG. 1, the present disclosure provides in an embodiment a method for integrating wireless communication and wireless sensing, which includes the following steps.

Step 101: transmitting, by a communication device, a wireless sensing signal in a target slot position related to a switching point between signal transmission and signal reception of a wireless communication signal.

In the embodiments of the present disclosure, the wireless sensing signal is used to detect information such as a distance or an image of a target object. The target object is a communication device such as a base station or a UE, or any other object such as a vehicle or a building. The communication device is a base station or a UE.

For different communication devices, the target slot positions for transmitting the wireless sensing signal are different. Taking the base station as an example, the base station transmits the wireless sensing signal at a position adjacent to a switching point between downlink transmission and uplink reception of the wireless communication signal. Taking the terminal as an example, the terminal transmits the wireless sensing signal at a position adjacent to a switching point between uplink transmission and downlink reception of the wireless communication signal. Through transmitting the wireless sensing signal, the communication device determines whether there is the target object and determines the other sensing parameters of the target object.

Step 102: receiving an echo signal corresponding to the wireless sensing signal in the case that a signal transmission slot of the wireless communication signal is ended.

After the signal transmission slot of the wireless communication signal has been ended, the communication device starts to receive the echo signal corresponding to the wireless sensing signal. After the wireless sensing signal has been transmitted by the communication device, when there is the target object, the echo signal is reflected by the target object, and the communication device performs sensing processing in accordance with the echo signal.

When the communication device is a base station, after a downlink transmission slot of the wireless communication signal is ended, the base station starts to receive the echo signal corresponding to the wireless sensing signal. When the communication device is a UE, after an uplink transmission slot of the wireless communication signal is ended, the UE starts to receive the echo signal corresponding to the wireless sensing signal.

According to the embodiments of the present disclosure, the wireless sensing signal is transmitted during the switching of the transmission and reception of the wireless communication signal, and the echo signal corresponding to the wireless sensing signal is received after the wireless communication signal has been transmitted. As a result, it is able to minimize a mutual influence between the wireless communication signal and the wireless sensing signal in interfrequency multiplexing, thereby to reduce the requirement on a transceiver.

To be specific, the target slot position includes one of: a slot position with a duration of $\tau$ before an end time point of a first slot, the first slot being a last signal transmission slot of the wireless communication signal; a slot position with a duration of T after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In the case that the communication device is a base station, the first slot is a downlink slot, and the second slot is an idle slot or an uplink slot after the last signal transmission slot of the wireless communication signal. In the case that the communication device is a UE, the first slot is an uplink slot, and the second slot is an idle slot or a downlink slow after the last signal transmission slot of the wireless communication signal.

In the embodiments of the present disclosure, the target slot position is a time interval, and a slot adjacent to and after the last signal transmission slot of the wireless communication signal is an idle slot or a reception slot. In the case that the communication device is a base station, the adjacent slot is an idle slot or an uplink slot, and in the case that the communication device is a UE, the adjacent slot is an idle slot or a downlink slot. When the target slot position is a slot position with a duration of $\tau$ started before the end time point of the first slot and ended after the start time point of the second slot, a specific time of the duration $\tau$ before the end time point of the first slot and a specific time of the duration $\tau$ after the start time point of the second slot will not be particularly defined. For example, the duration $\tau$ is started at a position of $\tau/2$ before the end time point of the first slot and ended at a position of $\tau/2$ after the start time point of the second slot. In other words, the specific time of the duration $\tau$ before the end time point of the first slot may be equal to, or not equal to, the specific time of the duration $\tau$ after the start time point of the second slot.

Taking the base station as an example, the target slot position is a slot position corresponding to a time interval with a duration of $\tau$ and at a tail of the last downlink transmission slot of the wireless communication signal in a frame structure, as indicated by (a1) and (a2) in FIG. 2. In (a1), a slot after and adjacent to the last signal transmission slot of the wireless communication signal (i.e., the last downlink slot) is an uplink slot, and in (a2), the adjacent slot is an idle slot.

Optionally, the target slot position is a slot corresponding to a time interval with a duration of $\tau$ and at a header of the last downlink transmission slot of the wireless communication signal, as indicated by (b1) and (b2) in FIG. 3. In (b1), a slot after and adjacent to the last signal transmission slot of the wireless communication signal (i.e., the last downlink slot) is an uplink slot, and in (b2), the adjacent slot is an idle slot.

Optionally, the target slot position is a slot position corresponding to a time interval with a duration of $\tau$ and crossing the end time point of the first slot and the start time point of the second slot, as indicated by (c1) and (c2) in FIG. 4. In (c1), a slot after and adjacent to the last signal transmission slot of the wireless communication signal (i.e., the last downlink slot) is an uplink slot, and in (c2), the adjacent slot is an idle slot.

Taking the terminal as an example, the target slot position is a slot position corresponding to a time interval with a duration of $\tau$ and at a tail of the last uplink transmission slot of the wireless communication signal in a frame structure, as indicated by (a1) and (a2) in FIG. 5. In (a1), a slot after and adjacent to the last signal transmission slot of the wireless communication signal (i.e., the last uplink slot) is a downlink slot, and in (a2), the adjacent slot is an idle slot.

Optionally, the target slot position is a slot position corresponding to a time interval with a duration of $\tau$ and at a header of an adjacent slot after the last uplink transmission slot of the wireless communication signal, as indicated by (b1) and (b2) in FIG. 6. In (b1), a slot after and adjacent to the last signal transmission slot of the wireless communication signal (i.e., the last uplink slot) is a downlink slot, and in (b2), the adjacent slot is an idle slot.

Optionally, the target slot position is a slot position corresponding to a time interval with a duration of $\tau$ and crossing the end time point of the first slot and the start time point of the second slot, as indicated by (c1) and (c2) in FIG. 7. In (c1), a slot after and adjacent to the last signal transmission slot of the wireless communication signal (i.e., the last uplink slot) is a downlink slot, and in (c2), the adjacent slot is an idle slot.

As shown in FIGS. 3, 4, 6 and 7, when the target slot position is a slot position with a duration of $\tau$ after the start time point of the second slot or a slot position with a duration of $\tau$ started before the end time point of the first slot and ended after the start time point of the second slot, the communication device needs to perform transmission and reception operations simultaneously during the transmission of the wireless sensing signal, i.e., the communication device is provided with such a function of transmitting and receiving signals simultaneously on a same frequency band. To be specific, a full duplexing scheme or a multi-Transmission Reception Point (TRP) cooperative sensing scheme is adopted by the communication device.

Further, the wireless sensing signal occupies an entire operating frequency band or a part of the operating frequency band corresponding to the target slot position. When the wireless sensing signal occupies a part of the operating frequency band corresponding to the target slot position, the wireless communication signal is transmitted or not transmitted on the other frequency band corresponding to the target slot position. When the wireless sensing signal occupies a part of the operating frequency band corresponding to the target slot position and the wireless communication signal is transmitted on the other frequency band other than the part of operating frequency band, it is able to transmit the wireless sensing signal and the wireless communication signal in a frequency-division multiplexing manner, thereby to utilize the frequency resources to the greatest extent.

To be specific, the transmitting the wireless sensing signal in the target slot position related to the switching point between the signal transmission and the signal reception of the wireless communication signal includes one of the followings.

(1) Transmitting the wireless sensing signal on the entire operating frequency band corresponding to the target slot position.

Figure 8A:
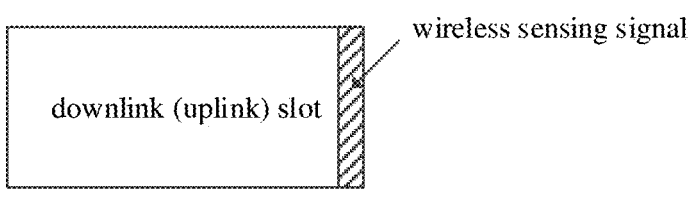
FIG. 8*a* is a schematic view showing an operating frequency band for transmitting the wireless sensing signal according to an embodiment of the present disclosure.

In the embodiments of the present disclosure, the communication device merely transmits the wireless sensing signal on the operating frequency band corresponding to the target slot position, as shown in FIG. 8*a*, and the wireless sensing signal occupies the entire frequency band. When the communication device is the base station, the slot in FIG. 8*a* is a downlink slot, and when the communication device is the UE, the slot in FIG. 8*a* is an uplink slot. A hatched portion in FIG. 8*a* represents the frequency band for transmitting the wireless sensing signal. At this time, the wireless communication signal is transmitted on a frequency band before the operating frequency band in FIG. 8*a*.

(2) Transmitting the wireless sensing signal on a part of the operating frequency band corresponding to the target slot position.

Figure 8B:
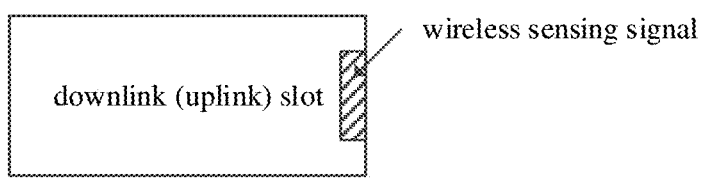
FIG. 8*b* is another schematic view showing the operating frequency band for transmitting the wireless sensing signal according to an embodiment of the present disclosure.

In the embodiments of the present disclosure, the communication device transmits the wireless sensing signal on a part of the operating frequency band corresponding to the target slot position, as shown in FIG. 8*b*, and the wireless sensing signal occupies a part of the frequency band. When the communication device is the base station, the slot in FIG. 8*b* is a downlink slot, and when the communication device is the UE, the slot in FIG. 8*b* is an uplink slot. A hatched portion in FIG. 8*b* represents the frequency band for transmitting the wireless sensing signal. In FIG. 8*b*, the wireless sensing signal and the wireless communication signal are not transmitted in a frequency-division multiplexing manner.

(3) Transmitting the wireless sensing signal and the wireless communication signal in a frequency-division multiplexing manner on the operating frequency band corresponding to the target slot position.

Figure 8C:
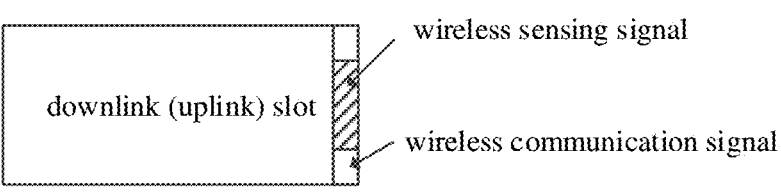
FIG. 8*c* is yet another schematic view showing the operating frequency band for transmitting the wireless sensing signal according to an embodiment of the present disclosure.

In the embodiments of the present disclosure, the communication device transmits the wireless sensing signal on a part of the operating frequency band corresponding to the target slot position, and transmits the wireless communication signal on the other frequency band of the operating frequency band, as shown in FIG. 8*c*. The wireless sensing signal occupies a part of the frequency band, and the wireless communication signal occupies the other frequency band. When the communication device is the base station, the slot in FIG. 8*c* is a downlink slot, and when the communication device is a UE, the slot in FIG. 8*c* is an uplink slot. A hatched portion in FIG. 8*c* is a frequency band for transmitting the wireless sensing signal, and a blank portion of the operating frequency band is a frequency band for transmitting the wireless communication signal. In FIG. 8*c*, the wireless sensing signal and the wireless communication signal are transmitted in a frequency-division multiplexing manner.

In the embodiments of the present disclosure, the wireless sensing and the wireless communication are harmonized so as to be performed on a same operating frequency band, so it is able to utilize the frequency resources to the greatest extent.

Further, the transmitting the wireless sensing signal in the target slot position related to the switching point between the signal transmission and the signal reception of the wireless communication signal includes transmitting, within a sensing detection period, the wireless sensing signal for N times with a target period, where $N \times T1 < T$, $T1$ represents the target period and it is an integral multiple of a duration of a subframe for transmitting the wireless communication signal, and $\tau$ represents the sensing detection period.

In the embodiments of the present disclosure, a same wireless sensing signal or different wireless sensing signals are transmitted, within the sensing detection period, for N times with the target period, so as to achieve a deblurring effect and/or scan an environment.

Figure 9:
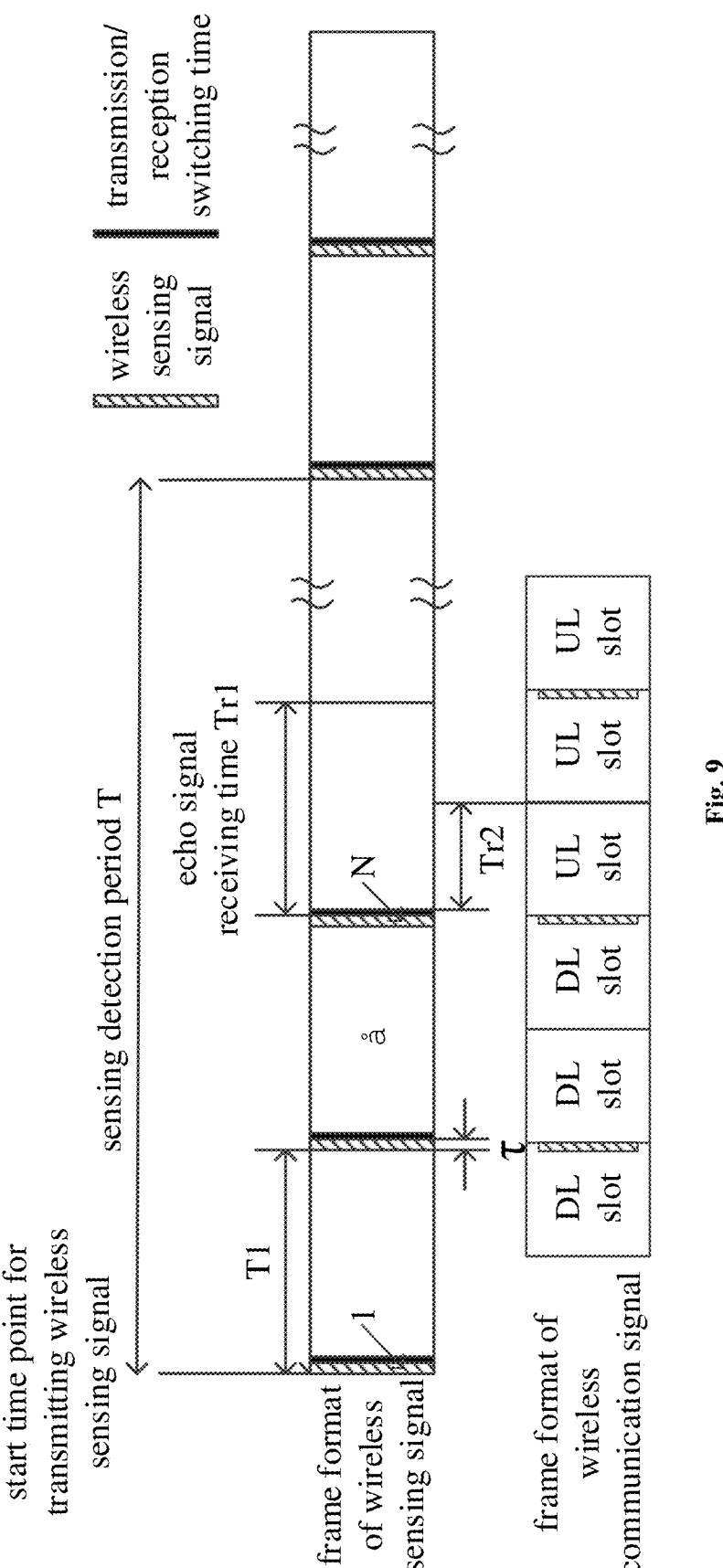
FIG. 9 is a schematic view showing a frame format according to an embodiment of the present disclosure.

To be specific, when the communication device is the base station, FIG. 9 shows frame formats of the wireless sensing signal and the wireless communication signal. The wireless sensing signal is generated through a signal generation method widely used by a radar system, e.g., linear frequency modulation or pulse-phase modulation. Within the sensing detection period, the wireless sensing signal is transmitted with the target period T1 for N times, and a duration of each transmission of the wireless sensing signal is r, where $N \times T1 < T$. Through the two periods for transmitting the wireless sensing signal (the sensing detection period and the target period), it is able to achieve a deblurring effect, and through transmitting the wireless sensing signal multiple times, it is able to improve the sensing accuracy. In addition, it is able to prevent the occurrence of such a circumstance where it is impossible to determine a transmission position of the echo signal when merely one period is provided and the echo signal is received within a next period rather than a period where the wireless sensing signal is transmitted.

In an optional embodiment of the present disclosure, in the case that the communication device operates in a full duplexing mode, a time for receiving the echo signal corresponding to the wireless sensing signal is $Tr1=T1-\tau$, where Tr1 represents the time for receiving the echo signal, and $\tau$ represents a duration of each transmission of the wireless sensing signal. A switching time between the signal transmission and the signal reception of the wireless communication signal is zero.

In another optional embodiment of the present disclosure, in the case that the communication device operates in a time-division multiplexing (TDD) mode, a time for receiving the echo signal corresponding to the wireless sensing signal is $Tr2=T1-\tau-Td1-T0$, where Tr2 represents the time for receiving the echo signal, $\tau$ represents a duration of each transmission of the wireless sensing signal, Td1 represents a time of a transmission slot of the wireless communication signal, and TO represents a switching time between the signal transmission and the signal reception of the wireless communication signal.

A time window for receiving the echo signal corresponding to the wireless sensing signal is determined by a receiver of the communication device itself in accordance with a sensing detection range. The receiver of the communication device detects the echo signal during the reception of the echo signal, and determines an arrival time, a phase and intensity of the echo signal through a detection algorithm for a local wireless sensing signal and the echo signal, e.g., moving filtration, so as to sense the information about the target object, e.g., a target position, a pose or an image of the target object.

The implementation of the method for integrating wireless communication and wireless sensing will be described hereinafter in conjunction with the embodiments when the communication device is the base station and when the communication device is the UE.

First Embodiment: The Base Station Transmits the Wireless Sensing Signal

The base station transmits the wireless sensing signal at a position adjacent to the switching point between the downlink transmission and the uplink reception, and after the downlink transmission has been ended, starts to receive the echo signal corresponding to the wireless sensing signal. The position adjacent to the switching point between the downlink transmission and the uplink reception refers to, in the frame structure, a position at a tail of a last slot for the downlink transmission (as shown in FIG. 2), a position at a header of a slot (an idle sot or an uplink slot) after the last slot for the downlink transmission (as shown in FIG. 3), or a position crossing the tail of the last slot and the header of the slot after the last slot (as shown in FIG. 4).

To be specific, when the downlink transmission has been ended, it means that the downlink slot for transmitting the wireless communication signal is ended. In the two schemes where the wireless sensing signal is transmitted at the position at the tail of the last slot and the wireless sensing signal is transmitted at the position crossing the tail of the last slot and the header of the slot after the last slot, the base station needs to transmit and receive the signals simultaneously, i.e., the base station is provided with a function of transmitting and receiving the signals simultaneously on a same frequency band. To be specific, a full duplexing scheme or a multi-TRP cooperative sensing scheme is adopted by the base station.

The wireless sensing signal is merely transmitted on the operating frequency band corresponding to the target slot position, i.e., the wireless sensing signal occupies the entire operating frequency band or a part of the operating frequency band, or the wireless communication signal and the wireless sensing signal are transmitted simultaneously in a frequency-division duplexing manner, as shown in FIGS. 8*a* to 8*c*.

Second Embodiment: The Terminal Transmits the Wireless Sensing Signal

The terminal transmits the wireless sensing signal at a position adjacent to the switching point between the downlink transmission and the uplink reception, and after the downlink transmission has been ended, starts to receive the echo signal corresponding to the wireless sensing signal.

The position adjacent to the switching point between the uplink transmission and the downlink reception refers to, in the frame structure, a position at a tail of a last slot for the uplink transmission (as shown in FIG. 5), a position at a header of a slot (an idle sot or a downlink slot) after the last slot for the uplink transmission (as shown in FIG. 6), or a position crossing the tail of the last slot and the header of the slot after the last slot (as shown in FIG. 7).

To be specific, when the uplink transmission has been ended, it means that the uplink slot for transmitting the wireless communication signal is ended. When the wireless sensing signal is transmitted within the slot after the last slot for the uplink transmission, the terminal needs to transmit and receive the signals simultaneously, i.e., the terminal is provided with a function of transmitting and receiving the signals simultaneously on a same frequency band.

The wireless sensing signal is merely transmitted on the operating frequency band corresponding to the target slot position, i.e., the wireless sensing signal occupies the entire operating frequency band or a part of the operating frequency band, or the wireless communication signal and the wireless sensing signal are transmitted simultaneously in a frequency-division duplexing manner, as shown in FIGS. 8*a* to 8*c*.

In a possible embodiment of the present disclosure, before transmitting the wireless sensing signal in the target slot position related to the switching point between the signal transmission and the signal reception of the wireless communication signal, the method further includes generating the wireless sensing signal. Before transmitting the wireless sensing signal in the target slot position related to the switching point between the signal transmission and the signal reception of the wireless communication signal, the method further includes generating the wireless communication signal.

In a possible embodiment of the present disclosure, the method further includes: generating a first transmission control signal for transmitting the wireless sensing signal, the first transmission control signal being used to control a first transmission channel to transmit the wireless sensing signal; and in the case that the signal transmission slot of the wireless communication signal is ended, generating a first reception control signal for receiving the echo signal corresponding to the wireless sensing signal, the first reception control signal being used to control a first reception channel to receive the echo signal. To be specific, the transmitting the wireless sensing signal in the target slot position related to the switching point between the signal transmission and the signal reception of the wireless communication signal includes transmitting the wireless sensing signal through the first transmission channel within the target slot position related to the switching point between the signal transmission and the signal reception of the wireless communication signal in accordance with the first transmission control signal. The receiving the echo signal corresponding to the wireless sensing signal in the case that the signal transmission slot of the wireless communication signal is ended includes, in the case that the first reception channel is enabled, receiving the echo signal corresponding to the wireless sensing signal through the first reception channel in accordance with the first reception control signal.

The scheme in this embodiment of the present disclosure is applied to a scenario where the communication device transmits the wireless sensing signal in the slot with a duration of $\tau$ before the end time point of the first slot. The communication device transmits the wireless communication signal and the wireless sensing signal through the first transmission channel, and after the signal transmission slot of the wireless communication signal (the downlink slot or uplink slow) has been ended, disables the first transmission channel and enables the first reception channel, no matter whether a reception slot (uplink or downlink slot) or an idle slot is located after the signal transmission slot. After the communication device has transmitted the wireless communication signal and the wireless sensing signal, the communication device performs switching between the first transmission channel and the first reception channel, and when the first reception channel is enabled, receives the echo signal corresponding to the wireless sensing signal. To be specific, the wireless sensing signal is located at the tail of the last transmission slot of the wireless communication signal, and it occupies the entire operating frequency band or a part of the operating frequency band, or the wireless sensing signal and the wireless communication signal are transmitted on a same operating frequency band in a frequency-division duplexing manner.

In order to support to transmit the wireless sensing signal in a slot after the last transmission slot of the wireless communication signal, in another possible embodiment of the present disclosure, the method further includes: generating a second transmission control signal for transmitting the wireless communication signal, the second transmission control signal being used to control a second transmission channel to transmit the wireless communication signal; after the transmission of the wireless communication signal, generating a second reception control signal for receiving the wireless communication signal, the second reception control signal being used to control a second reception channel to receive the wireless communication signal;

before the transmission of the wireless sensing signal, generating a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generating a third reception control signal for receiving the echo signal corresponding to the wireless sensing signal, the third reception control signal being used to control a third reception channel to receive the echo signal.

In the case that the second transmission channel is enabled, the communication device transmits the wireless communication signal through the second transmission channel in accordance with the second transmission control signal, and in the case that the second reception channel is enabled, the communication device receives the wireless communication signal through the second reception channel in accordance with the second reception control signal. To be specific, the transmitting the wireless sensing signal in the target slot position related to the switching point between the signal transmission and the signal reception of the wireless communication signal includes, in the case that the third transmission channel is enabled, transmitting the wireless sensing signal through the third transmission channel within the target slot position related to the switching point between the signal transmission and the signal reception of the wireless communication signal in accordance with the third transmission control signal. The receiving the echo signal corresponding to the wireless sensing signal in the case that the signal transmission slot of the wireless communication signal is ended includes, in the case that the third reception channel is enabled, receiving the echo signal corresponding to the wireless sensing signal through the third reception channel in accordance with the third reception control signal.

In the embodiments of the present disclosure, the communication device enables the second transmission channel prior to the transmission of the wireless sensing signal, and when the second transmission channel has been enabled, transmits the wireless communication signal through the second transmission channel. Then, the communication device switches the second transmission channel into the second reception channel, and when the second reception channel has been enabled, receives the wireless communication signal through the second reception channel.

The communication device enables the third transmission channel prior to the transmission of the wireless sensing signal; in the case that the third transmission channel has been enabled, transmits the wireless sensing signal through the third transmission channel; and after the wireless sensing signal has been transmitted, disables (or does not disable) the third transmission channel After the signal transmission slot (downlink slot or uplink slot) of the wireless communication signal has been ended, the communication device enables the third reception channel, receives the echo signal corresponding to the wireless sensing signal through the third reception channel, and disables (or does not disable) the third reception channel after the echo signal has been received. To be specific, the wireless sensing signal is located at the tail of the last transmission slot of the wireless communication signal, at the header of the slot after the last transmission slot of the wireless communication signal, or crossing the tail of the last transmission slot of the wireless communication signal and the header of the slot after the last transmission slot. The wireless sensing signal occupies the entire operating frequency band or a part of the operating frequency band, or the wireless sensing signal and the wireless communication signal re transmitted on a same operating frequency band in a frequency-division duplexing manner.

According to the embodiments of the present disclosure, the wireless sensing signal is transmitted during the switching of the transmission and reception of the wireless communication signal, and the echo signal corresponding to the wireless sensing signal is received after the wireless communication signal has been transmitted. As a result, it is able to minimize a mutual influence between the wireless communication signal and the wireless sensing signal in interfrequency multiplexing, thereby to reduce the requirement on the transceiver.

Schemes in the embodiments of the present disclosure may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS).

The method for integrating wireless communication and wireless sensing has been described hereinabove, and the corresponding device will be described hereinafter in conjunction with the drawings.

Figure 10:
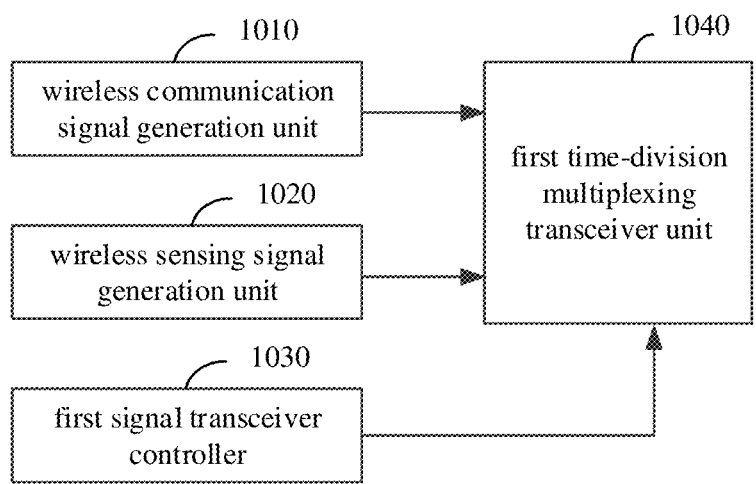
FIG. 10 is a schematic view showing an apparatus for integrating wireless communication and wireless sensing according to an embodiment of the present disclosure.

As shown in FIG. 10, the present disclosure further provides in some embodiments a device for implementing the above-mentioned method, which includes a wireless communication signal generation unit 1010, a wireless sensing signal generation unit 1020, a first signal transceiver controller 1030 and a first time-division multiplexing transceiver unit 1040. The wireless communication signal generation unit 1010 is configured to generate a wireless communication signal and transmit it to the first time-division multiplexing transceiver unit 1040. The wireless sensing signal generation unit 1020 is configured to generate a wireless sensing signal and transmit it to the first time-division multiplexing transceiver unit 1040.

The first signal transceiver controller 1030 is configured to control a switching time of the first time-division multiplexing transceiver unit 1040 in accordance with a frame structure. To be specific, the first signal transceiver controller 1030 is configured to: control a first transmission channel to be disabled (or not disabled) after the signal transmission slot (downlink slot or uplink slot) of the wireless communication signal is ended, and start a first reception channel, no matter whether a reception slot (uplink slot or downlink slot) or an idle slot is located after the signal transmission slot; and determine a time/frequency duplexing scheme of the wireless communication signal and the wireless sensing signal, and notify it to the first time-division multiplexing transceiver unit 1040.

The first time-division multiplexing transceiver unit 1040 is configured to: transmit the received wireless communication signal and wireless sensing signal in accordance with an indication from the first signal transceiver controller 1030 when the first transmission channel is enabled; switch the first transmission channel into the first reception channel;

and when the first reception channel is enabled, receive an echo signal corresponding to the wireless sensing signal.

It should be appreciated that, this device is applied to a scenario where the communication device transmits the wireless sensing signal at the tail of the last transmission slot. The wireless sensing signal occupies the entire operating frequency band or a part of the operating frequency band, or the wireless sensing signal and the wireless communication signal are transmitted on a same operating frequency band in a frequency-division duplexing manner.

Figure 11:
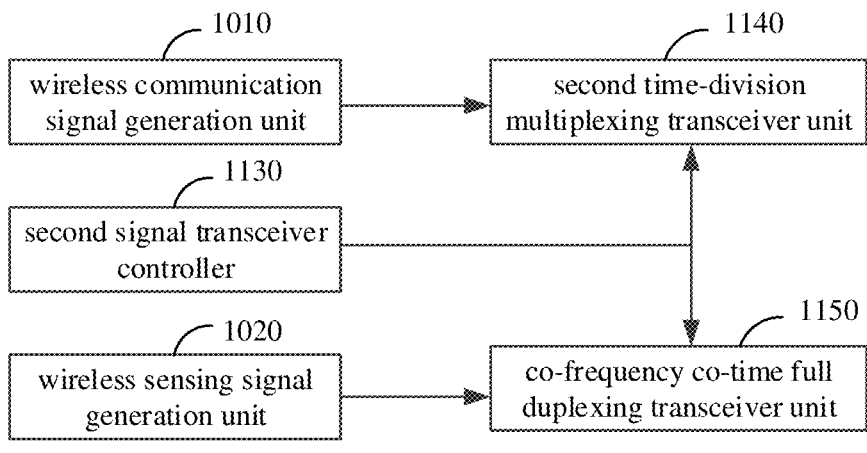
FIG. 11 is another schematic view showing the apparatus for integrating wireless communication and wireless sensing according to an embodiment of the present disclosure.

As shown in FIG. 11, the present disclosure further provides in some embodiments a device for implementing the above-mentioned method, which includes a wireless communication signal generation unit 1010, a wireless sensing signal generation unit 1020, a second signal transceiver controller 1130, a second time-division multiplexing transceiver unit 1140, and a co-frequency co-time full duplexing transceiver unit 1150. The wireless communication signal generation unit 1010 is configured to generate a wireless communication signal and transmit it to the second time-division multiplexing transceiver unit 1140. The wireless sensing signal generation unit 1020 is configured to generate a wireless sensing signal and transmit it to the co-frequency co-time full duplexing transceiver unit 1150.

The second signal transceiver controller 1130 is configured to control a switching time of the second time-division multiplexing transceiver unit 1140 in accordance with a frame structure, and control a switching time of the co-frequency co-time full duplexing transceiver unit 1150. To be specific, the second signal transceiver controller 1130 enables a third transmission channel for the co-frequency co-time full duplexing transceiver unit 1150 before the transmission of the wireless sensing signal, and disables the third transmission channel after the wireless sensing signal has been transmitted. After the signal transmission slot (downlink slot or uplink slot) of the wireless communication signal has been ended, the second signal transceiver controller 1130 enables a third reception channel for the co-frequency co-time full duplexing transceiver unit 1150, and disables the third reception channel after the echo signal has been received. The second signal transceiver controller 1130 is further configured to determine a time/frequency duplexing scheme of the wireless communication signal and the wireless sensing signal, and notify it to the second time-division multiplexing transceiver unit 1140 and the co-frequency co-time full duplexing transceiver unit 1150.

The second time-division multiplexing transceiver unit 1140 is configured to: transmit the received wireless communication signal in accordance with an indication from the second signal transceiver controller 1130 when the second transmission channel is enabled; switch the second transmission channel into the second reception channel; and when the second reception channel is enabled, receive the wireless communication signal.

The co-frequency co-time full duplexing transceiver unit 1150 is configured to: transmit the received wireless sensing signal in accordance with the indication from the second signal transceiver controller 1130 when the third transmission channel is enabled; switch the third transmission channel into the third reception channel; and when the third reception channel is enabled, receive the echo signal corresponding to the wireless sensing signal.

It should be appreciated that, this device is applied to a scenario where the communication device transmits the wireless sensing signal at the tail of the last transmission slot of the wireless communication signal, at the header of the slot after the last transmission slot of the wireless communication signal, or crossing the tail of the last transmission slot of the wireless communication signal and the header of the slot after the last transmission slot. The wireless sensing signal occupies the entire operating frequency band or a part of the operating frequency band corresponding to the target slot position, or the wireless sensing signal and the wireless communication signal are transmitted on a same operating frequency band in a frequency-division duplexing manner.

The present disclosure further provides in some embodiments an apparatus for integrating wireless communication and wireless sensing for a communication device, e.g., a base station or a UE, which includes a signal transceiver unit configured to transmit a wireless sensing signal in a target slot position related to a switching point between signal transmission and signal reception of a wireless communication signal, and receive an echo signal corresponding to the wireless sensing signal in the case that a signal transmission slot of the wireless communication signal is ended.

In a possible embodiment of the present disclosure, the target slot position includes one of: a slot position with a duration of $\tau$ before an end time point of a first slot, the first slot being a last signal transmission slot of the wireless communication signal; a slot position with a duration of $\tau$ after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In a possible embodiment of the present disclosure, in the case that a communication device is a base station, the first slot is a downlink slot, and the second slot is an idle slot or an uplink slot after the last signal transmission slot of the wireless communication signal; and in the case that the communication device is a UE, the first slot is an uplink slot, and the second slot is an idle slot or a downlink slot after the last signal transmission slot of the wireless communication signal.

In a possible embodiment of the present disclosure, the wireless sensing signal occupies an entire operating frequency band or a part of the operating frequency band corresponding to the target slot position.

In a possible embodiment of the present disclosure, the signal transceiver unit is specifically configured to transmit, within a sensing detection period, the wireless sensing signal for N times with a target period, where $N \times T1 < T$, T1 represents the target period and it is an integral multiple of a duration of a subframe for transmitting the wireless communication signal, and $\tau$ represents the sensing detection period.

In a possible embodiment of the present disclosure, in the case that the communication device operates in a full duplexing mode, a time for receiving the echo signal corresponding to the wireless sensing signal is $Tr1 = T1 - \tau$, where Tr1 represents the time for receiving the echo signal, and $\tau$ represents a duration of each transmission of the wireless sensing signal.

In a possible embodiment of the present disclosure, in the case that the communication device operates in a time-division multiplexing mode, a time for receiving the echo signal corresponding to the wireless sensing signal is $Tr2 = T1 - \tau - Td1 - T0$, where Tr2 represents the time for receiving the echo signal, $\tau$ represents a duration of each transmission of the wireless sensing signal, Td1 represents a duration of the signal transmission slot of the wireless communication signal, and T0 represents a switching time between the signal transmission and the signal reception of the wireless communication signal.

In a possible embodiment of the present disclosure, as shown in FIG. 10, the device further includes a first signal transceiver controller 1030 configured to: generate a first transmission control signal for transmitting the wireless sensing signal, the first transmission control signal being used to control a first transmission channel to transmit the wireless sensing signal; and in the case that the signal transmission slot of the wireless communication signal is ended, generate a first reception control signal for receiving the echo signal corresponding to the wireless sensing signal, the first reception control signal being used to control a first reception channel to receive the echo signal.

In a possible embodiment of the present disclosure, as shown in FIG. 10, the signal transceiver unit includes a first time-division multiplexing transceiver unit 1040 configured to receive a control signal from the first signal transceiver controller 1030. The control signal includes a control signal for controlling the switching time of the first time-division multiplexing transceiver unit 1040 in accordance with a frame structure, and a control signal for determining a time/frequency duplexing scheme for the wireless communication signal and the wireless sensing signal.

To be specific, the first time-division multiplexing transceiver unit is configured to: transmit the wireless sensing signal through the first transmission channel within the target slot position related to the switching point between the signal transmission and the signal reception of the wireless communication signal in accordance with the first transmission control signal; and, in the case that the first reception channel is enabled, receive the echo signal corresponding to the wireless sensing signal through the first reception channel in accordance with the first reception control signal.

In a possible embodiment of the present disclosure, as shown in FIG. 11, the device further includes a second signal transceiver controller 1130 configured to: generate a second transmission control signal for transmitting the wireless communication signal, the second transmission control signal being used to control a second transmission channel to transmit the wireless communication signal; after the transmission of the wireless communication signal, generate a second reception control signal for receiving the wireless communication signal, the second reception control signal being used to control a second reception channel to receive the wireless communication signal; before the transmission of the wireless sensing signal, generate a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generate a third reception control signal for receiving the echo signal corresponding to the wireless sensing signal, the third reception control signal being used to control a third reception channel to receive the echo signal.

In a possible embodiment of the present disclosure, as shown in FIG. 11, the signal transceiver unit includes a second time-division multiplexing transceiver unit 1140 configured to receive a control signal from the second signal transceiver controller 1130. The control signal includes a control signal for controlling the switching time of the second time-division multiplexing transceiver unit 1140 in accordance with second frame structure, and a control signal for determining a time/frequency duplexing scheme for the wireless communication signal and the wireless sensing signal.

To be specific, the second time-division multiplexing transceiver unit is configured to: in the case that the second transmission channel is enabled, transmit the wireless communication signal through the second transmission channel in accordance with the second transmission control signal; and in the case that the second reception channel is enabled, receive the wireless communication signal through the second reception channel in accordance with the second reception control signal.

In a possible embodiment of the present disclosure, as shown in FIG. 11, the signal transceiver unit further includes a co-frequency co-time full duplexing transceiver unit 1150 configured to receive a control signal from the second signal transceiver controller 1130. The control signal includes a control signal for controlling the switching time of the co-frequency co-time full duplexing transceiver unit 1150 in accordance with second frame structure, and a control signal for determining a time/frequency duplexing scheme for the wireless communication signal and the wireless sensing signal.

To be specific, the co-frequency co-time full duplexing transceiver unit is configured to: in the case that the third transmission channel is enabled, transmit the wireless sensing signal through the third transmission channel within the target slot position related to the switching point between the signal transmission and the signal reception of the wireless communication signal in accordance with the third transmission control signal; and, in the case that the third reception channel is enabled, receive the echo signal corresponding to the wireless sensing signal through the third reception channel in accordance with the third reception control signal.

In a possible embodiment of the present disclosure, as shown in FIGS. 10 and 11, the device further includes a wireless sensing signal generation unit 1020 configured to generate the wireless sensing signal.

In a possible embodiment of the present disclosure, as shown in FIGS. 10 and 11, the device further includes a wireless communication signal generation unit 1010 configured to generate the wireless communication signal.

It should be appreciated that, the device corresponds to the method for using wireless communication and wireless sensing mentioned hereinabove, and the implementation of the device may refer to that of the method with a same technical effect. The method and the device are provided on the basis of a same inventive concept, and a principle of the method for solving the problem is similar to that of the device, so the implementation of the device may refer to that of the method.

It should be further appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

Figure 12:
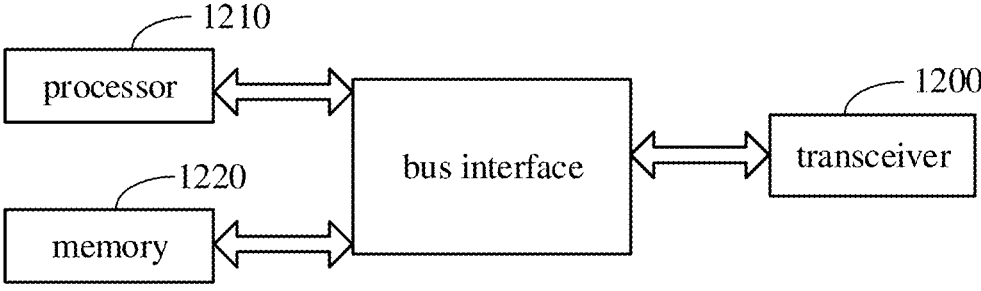
FIG. 12 is yet another schematic view showing the apparatus for integrating wireless communication and wireless sensing according to an embodiment of the present disclosure.

As shown in FIG. 12, the present disclosure further provides in some embodiments an apparatus for integrating wireless communication and wireless sensing for a communication device, e.g., a base station or a UE, which includes a memory 1220, a transceiver 1200 and a processor 1210. The memory 1220 is configured to store therein a computer program. The transceiver 1200 is configured to transmit and receive data under the control of the processor 1210. The processor 1210 is configured to read the computer program in the memory 1220, so as to: transmit a wireless sensing signal in a target slot position related to a switching point between signal transmission and signal reception of a wireless communication signal; and receive an echo signal corresponding to the wireless sensing signal in the case that a signal transmission slot of the wireless communication signal is ended.

In a possible embodiment of the present disclosure, the target slot position includes one of: a slot position with a duration of $\tau$ before an end time point of a first slot, the first slot being a last signal transmission slot of the wireless communication signal; a slot position with a duration of $\tau$ after a start time point of a second slot, the second slot being a slot after and adjacent to the last signal transmission slot of the wireless communication signal; or a slot position with a duration of $\tau$ started before the end time point of the first slot and ended after the start time point of the second slot, where $\tau$ represents a duration of each transmission of the wireless sensing signal.

In a possible embodiment of the present disclosure, in the case that a communication device is a base station, the first slot is a downlink slot, and the second slot is an idle slot or an uplink slot after the last signal transmission slot of the wireless communication signal; and in the case that the communication device is a UE, the first slot is an uplink slot, and the second slot is an idle slot or a downlink slot after the last signal transmission slot of the wireless communication signal.

In a possible embodiment of the present disclosure, the wireless sensing signal occupies an entire operating frequency band or a part of the operating frequency band corresponding to the target slot position.

In a possible embodiment of the present disclosure, the transmitting the wireless sensing signal in the target slot position related to the switching point between the signal transmission and the signal reception of the wireless communication signal includes transmitting, within a sensing detection period, the wireless sensing signal for N times with a target period, where $N \times T1 < T$, T1 represents the target period and it is an integral multiple of a duration of a subframe for transmitting the wireless communication signal, and $\tau$ represents the sensing detection period.

In a possible embodiment of the present disclosure, in the case that the communication device operates in a full duplexing mode, a time for receiving the echo signal corresponding to the wireless sensing signal is $Tr1 = T1 - \tau$, where Tr1 represents the time for receiving the echo signal, and $\tau$ represents a duration of each transmission of the wireless sensing signal.

In a possible embodiment of the present disclosure, in the case that the communication device operates in a time-division multiplexing mode, a time for receiving the echo signal corresponding to the wireless sensing signal is $Tr2 = T1 - \tau - Td1 - T0$, where Tr2 represents the time for receiving the echo signal, $\tau$ represents a duration of each transmission of the wireless sensing signal, Td1 represents a time of a transmission slot of the wireless communication signal, and T0 represents a switching time between the signal transmission and the signal reception of the wireless communication signal.

In a possible embodiment of the present disclosure, the processor is further configured to execute the computer program, so as to: generate a first transmission control signal for transmitting the wireless sensing signal, the first transmission control signal being used to control a first transmission channel to transmit the wireless sensing signal; and in the case that the signal transmission slot of the wireless communication signal is ended, generate a first reception control signal for receiving the echo signal corresponding to the wireless sensing signal, the first reception control signal being used to control a first reception channel to receive the echo signal.

In a possible embodiment of the present disclosure, the transmitting the wireless sensing signal in the target slot position related to the switching point between the signal transmission and the signal reception of the wireless communication signal includes transmitting the wireless sensing signal through the first transmission channel within the target slot position related to the switching point between the signal transmission and the signal reception of the wireless communication signal in accordance with the first transmission control signal. The receiving the echo signal corresponding to the wireless sensing signal in the case that the signal transmission slot of the wireless communication signal is ended includes, in the case that the first reception channel is enabled, receiving the echo signal corresponding to the wireless sensing signal through the first reception channel in accordance with the first reception control signal.

In a possible embodiment of the present disclosure, the processor is further configured to execute the computer program, so as to: generate a second transmission control signal for transmitting the wireless communication signal, the second transmission control signal being used to control a second transmission channel to transmit the wireless communication signal; after the transmission of the wireless communication signal, generate a second reception control signal for receiving the wireless communication signal, the second reception control signal being used to control a second reception channel to receive the wireless communication signal; before the transmission of the wireless sensing signal, generate a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generate a third reception control signal for receiving the echo signal corresponding to the wireless sensing signal, the third reception control signal being used to control a third reception channel to receive the echo signal.

In a possible embodiment of the present disclosure, the processor is further configured to execute the computer program, so as to: in the case that the second transmission channel is enabled, transmit the wireless communication signal through the second transmission channel in accordance with the second transmission control signal; and in the case that the second reception channel is enabled, receive the wireless communication signal through the second reception channel in accordance with the second reception control signal.

In a possible embodiment of the present disclosure, the transmitting the wireless sensing signal in the target slot position related to the switching point between the signal transmission and the signal reception of the wireless communication signal includes, in the case that the third transmission channel is enabled, transmitting the wireless sensing signal through the third transmission channel within the target slot position related to the switching point between the signal transmission and the signal reception of the wireless communication signal in accordance with the third transmission control signal. The receiving the echo signal corresponding to the wireless sensing signal in the case that the signal transmission slot of the wireless communication signal is ended includes, in the case that the third reception channel is enabled, receiving the echo signal corresponding to the wireless sensing signal through the third reception channel in accordance with the third reception control signal.

In a possible embodiment of the present disclosure, prior to transmitting the wireless sensing signal in the target slot position related to the switching point between the signal transmission and the signal reception of the wireless communication signal, the processor is further configured to execute the computer program so as to generate the wireless sensing signal.

In a possible embodiment of the present disclosure, prior to transmitting the wireless sensing signal in the target slot position related to the switching point between the signal transmission and the signal reception of the wireless communication signal, the processor is further configured to execute the computer program so as to generate the wireless communication signal.

In FIG. 12, bus architecture may include a number of buses and bridges connected to each other, so as to connect various circuits for one or more processors 1210 and one or more memories 1220. In addition, as is known in the art, the bus architecture may be used to connect any other circuits, such as a circuit for a peripheral device, a circuit for a voltage stabilizer and a power management circuit. A bus interface may be provided, and the transceiver 1200 may consist of a plurality of elements, i.e., a transmitter and a receiver for communication with any other devices over a transmission medium. The processor 1210 may take charge of managing the bus architecture as well as general processings. The memory 1220 may store therein data for the operation of the processor 1210.

In a possible embodiment of the present disclosure, the processor 1210 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the computer program in the memory, so as to implement the above-mentioned method in accordance with obtained executable instructions. The processor may also be physically separated from the memory.

It should be appreciated that, the device in the embodiments of the present disclosure is used to implement the steps of the above-mentioned method with a same technical effect, which will not be particularly defined herein.

The present disclosure further provides in some embodiments a processor-readable storage medium storing therein a computer program. The computer program is executed by a processor so as to implement the above-mentioned method with a same technical effect, which will not be particularly defined herein. The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, one module may be a processing element arranged separately, or integrated into a chip of the above-mentioned device. In addition, this module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

Obviously, a person skilled in the art may make further modifications and variants without departing from the principle of the present disclosure, and these modifications and variants shall also fall within the scope of the present disclosure.

What is claimed is:

1. A method for integrating wireless communication and wireless sensing, comprising:

transmitting, by a communication device, a wireless sensing signal in a target slot position related to a switching point between signal transmission and signal reception of a wireless communication signal; and receiving an echo signal corresponding to the wireless sensing signal after a signal transmission slot of the wireless communication signal is ended;

wherein the target slot position comprises one of:

a slot position with a duration of $\tau$ before an end time point of a first slot, the first slot being a last signal transmission slot of the wireless communication signal;

a slot position with a duration of $\tau$ after a start time point of a second slot, the second slot being a slot after and adjacent to the last signal transmission slot of the wireless communication signal;

a slot position with a duration of $\tau$ started before the end time point of the first slot and ended after the start time point of the second slot, wherein $\tau$ represents a duration of each transmission of the wireless sensing signal;

wherein in the case that the communication device is a base station, the first slot is a downlink slot, and the second slot is an idle slot or an uplink slot after the last signal transmission slot of the wireless communication signal; and in the case that the communication device is a terminal, the first slot is an uplink slot, and the second slot is an idle slot or a downlink slot after the last signal transmission slot of the wireless communication signal.

2. The method according to claim 1, wherein the wireless sensing signal occupies an entire operating frequency band or a part of the operating frequency band corresponding to the target slot position.

3. The method according to claim 1, wherein the transmitting the wireless sensing signal in the target slot position related to the switching point between the signal transmission and the signal reception of the wireless communication signal comprises:

transmitting, within a sensing detection period, the wireless sensing signal for N times with a target period, where $N \times T1 < T$, T1 represents the target period and is an integral multiple of a duration of a subframe for transmitting the wireless communication signal, and T represents the sensing detection period.

4. The method according to claim 3, wherein in the case that the communication device operates in a full duplexing mode, a time for receiving the echo signal corresponding to the wireless sensing signal is $Tr1 = T1 - \tau$, where Tr1 represents the time for receiving the echo signal, and $\tau$ represents a duration of each transmission of the wireless sensing signal; or, in the case that the communication device operates in a time-division multiplexing mode, a time for receiving the echo signal corresponding to the wireless sensing signal is $Tr2 = T1 - \tau - Td1 - T0$, where Tr2 represents the time for receiving the echo signal, $\tau$ represents a duration of each transmission of the wireless sensing signal, Td1 represents a duration of the signal transmission slot of the wireless communication signal, and T0 represents a switching time between the signal transmission and the signal reception of the wireless communication signal.

5. The method according to claim 1, further comprising:

generating a first transmission control signal for transmitting the wireless sensing signal, the first transmission control signal being used to control a first transmission channel to transmit the wireless sensing signal; and generating a first reception control signal for receiving the echo signal corresponding to the wireless sensing signal, after the signal transmission slot of the wireless communication signal is ended, the first reception control signal being used to control a first reception channel to receive the echo signal, wherein the transmitting the wireless sensing signal in the target slot position related to the switching point between the signal transmission and the signal reception of the wireless communication signal comprises:

transmitting the wireless sensing signal through the first transmission channel in the target slot position related to the switching point between the signal transmission and the signal reception of the wireless communication signal in accordance with the first transmission control signal, wherein the receiving the echo signal corresponding to the wireless sensing signal after the signal transmission slot of the wireless communication signal is ended comprises:

receiving the echo signal corresponding to the wireless sensing signal through the first reception channel in accordance with the first reception control signal, in the case that the first reception channel is enabled.

6. The method according to claim 1, further comprising:

generating a second transmission control signal for transmitting the wireless communication signal, the second transmission control signal being used to control a second transmission channel to transmit the wireless communication signal;

after the transmission of the wireless communication signal, generating a second reception control signal for receiving the wireless communication signal, the second reception control signal being used to control a second reception channel to receive the wireless communication signal;

before the transmission of the wireless sensing signal, generating a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generating a third reception control signal for receiving the echo signal corresponding to the wireless sensing signal, the third reception control signal being used to control a third reception channel to receive the echo signal.

7. The method according to claim 6, further comprising:

in the case that the second transmission channel is enabled, transmitting the wireless communication signal through the second transmission channel in accordance with the second transmission control signal; and in the case that the second reception channel is enabled, receiving the wireless communication signal through the second reception channel in accordance with the second reception control signal, wherein the transmitting the wireless sensing signal in the target slot position related to the switching point between the signal transmission and the signal reception of the wireless communication signal comprises:

in the case that the third transmission channel is enabled, transmitting the wireless sensing signal through the third transmission channel in the target slot position related to the switching point between the signal transmission and the signal reception of the wireless communication signal in accordance with the third transmission control signal, wherein the receiving the echo signal corresponding to the wireless sensing signal after the signal transmission slot of the wireless communication signal is ended comprises:

in the case that the third reception channel is enabled, receiving the echo signal corresponding to the wireless sensing signal through the third reception channel in accordance with the third reception control signal.

8. The method according to claim 1, wherein prior to transmitting the wireless sensing signal in the target slot position related to the switching point between the signal transmission and the signal reception of the wireless communication signal, the method further comprises:

generating the wireless sensing signal; and/or, generating the wireless communication signal.

9. An apparatus for integrating wireless communication and wireless sensing, comprising a transceiver, a memory, a processor, and a computer program that is stored in the memory and executable by the processor, wherein when executing the computer program, the processor is configured to:

transmit a wireless sensing signal in a target slot position related to a switching point between signal transmission and signal reception of a wireless communication signal; and receive an echo signal corresponding to the wireless sensing signal after a signal transmission slot of the wireless communication signal is ended;

wherein the target slot position comprises one of:

a slot position with a duration of $\tau$ before an end time point of a first slot, the first slot being a last signal transmission slot of the wireless communication signal;

a slot position with a duration of $\tau$ after a start time point of a second slot, the second slot being a slot after and adjacent to the last signal transmission slot of the wireless communication signal;

a slot position with a duration of $\tau$ started before the end time point of the first slot and ended after the start time point of the second slot, wherein $\tau$ represents a duration of each transmission of the wireless sensing signal;

wherein in the case that the apparatus is a base station, the first slot is a downlink slot, and the second slot is an idle slot or an uplink slot after the last signal transmission slot of the wireless communication signal; and in the case that the apparatus is a terminal, the first slot is an uplink slot, and the second slot is an idle slot or a downlink slot after the last signal transmission slot of the wireless communication signal.

10. The apparatus according to claim 9, wherein the wireless sensing signal occupies an entire operating frequency band or a part of the operating frequency band corresponding to the target slot position, wherein the transmitting the wireless sensing signal in the target slot position related to the switching point between the signal transmission and the signal reception of the wireless communication signal comprises:

transmitting, within a sensing detection period, the wireless sensing signal for N times with a target period, where $N \times T1 < T$, T1 represents the target period and is an integral multiple of a duration of a subframe for transmitting the wireless communication signal, and T represents the sensing detection period.

11. The apparatus according to claim 10, wherein in the case that the communication device operates in a full duplexing mode, a time for receiving the echo signal corresponding to the wireless sensing signal is $Tr1=T1-\tau$, where Tr1 represents the time for receiving the echo signal, and $\tau$ represents a duration of each transmission of the wireless sensing signal;

or, wherein in the case that the communication device operates in a time-division multiplexing mode, a time for receiving the echo signal corresponding to the wireless sensing signal is Tr2=T1−τ−Td1−T0, where Tr2 represents the time for receiving the echo signal, τ represents a duration of each transmission of the wireless sensing signal, Td1 represents a duration of the signal transmission slot of the wireless communication signal, and T0 represents a switching time between the signal transmission and the signal reception of the wireless communication signal.

12. The apparatus according to claim 9, wherein the processor is further configured to execute the computer program, so as to:

generate a first transmission control signal for transmitting the wireless sensing signal, the first transmission control signal being used to control a first transmission channel to transmit the wireless sensing signal; and generate a first reception control signal for receiving the echo signal corresponding to the wireless sensing signal, after the signal transmission slot of the wireless communication signal is ended, the first reception control signal being used to control a first reception channel to receive the echo signal, wherein the transmitting the wireless sensing signal in the target slot position related to the switching point between the signal transmission and the signal reception of the wireless communication signal comprises:

transmitting the wireless sensing signal through the first transmission channel in the target slot position related to the switching point between the signal transmission and the signal reception of the wireless communication signal in accordance with the first transmission control signal, wherein the receiving the echo signal corresponding to the wireless sensing signal after the signal transmission slot of the wireless communication signal is ended comprises:

receiving the echo signal corresponding to the wireless sensing signal through the first reception channel in accordance with the first reception control signal, in the case that the first reception channel is enabled.

13. The apparatus according to claim 9, wherein the processor is further configured to execute the computer program, so as to:

generate a second transmission control signal for transmitting the wireless communication signal, the second transmission control signal being used to control a second transmission channel to transmit the wireless communication signal;

after the transmission of the wireless communication signal, generate a second reception control signal for receiving the wireless communication signal, the second reception control signal being used to control a second reception channel to receive the wireless communication signal;

before the transmission of the wireless sensing signal, generate a third transmission control signal for transmitting the wireless sensing signal, the third transmission control signal being used to control a third transmission channel to transmit the wireless sensing signal; and in the case that the wireless sensing signal has been transmitted and the signal transmission slot of the wireless communication signal is ended, generate a third reception control signal for receiving the echo signal corresponding to the wireless sensing signal, the third reception control signal being used to control a third reception channel to receive the echo signal.

14. The apparatus according to claim 13, wherein the processor is further configured to execute the computer program, so as to:

in the case that the second transmission channel is enabled, transmit the wireless communication signal through the second transmission channel in accordance with the second transmission control signal; and in the case that the second reception channel is enabled, receive the wireless communication signal through the second reception channel in accordance with the second reception control signal, wherein the transmitting the wireless sensing signal in the target slot position related to the switching point between the signal transmission and the signal reception of the wireless communication signal comprises:

in the case that the third transmission channel is enabled, transmitting the wireless sensing signal through the third transmission channel within the target slot position related to the switching point between the signal transmission and the signal reception of the wireless communication signal in accordance with the third transmission control signal, wherein the receiving the echo signal corresponding to the wireless sensing signal after the signal transmission slot of the wireless communication signal is ended comprises:

in the case that the third reception channel is enabled, receiving the echo signal corresponding to the wireless sensing signal through the third reception channel in accordance with the third reception control signal.

15. The apparatus according to claim 9, wherein prior to transmitting the wireless sensing signal in the target slot position related to the switching point between the signal transmission and the signal reception of the wireless communication signal, the processor is further configured to execute the computer program so as to:

generate the wireless sensing signal; and/or, generate the wireless communication signal.

16. A non-transitory processor-readable storage medium, storing therein a computer program, wherein the computer program, when executed by a processor, causes the processor to implement the following steps:

transmitting a wireless sensing signal in a target slot position related to a switching point between signal transmission and signal reception of a wireless communication signal; and receiving an echo signal corresponding to the wireless sensing signal after a signal transmission slot of the wireless communication signal is ended;

wherein the target slot position comprises one of:

a slot position with a duration of τ before an end time point of a first slot, the first slot being a last signal transmission slot of the wireless communication signal;

a slot position with a duration of τ after a start time point of a second slot, the second slot being a slot after and adjacent to the last signal transmission slot of the wireless communication signal;

a slot position with a duration of τ started before the end time point of the first slot and ended after the start time point of the second slot, wherein τ represents a duration of each transmission of the wireless sensing signal;

wherein in the case that the processor is a processor of a base station, the first slot is a downlink slot, and the second slot is an idle slot or an uplink slot after the last signal transmission slot of the wireless communication signal; and in the case that the processor is a processor of a terminal, the first slot is an uplink slot, and the second slot is an idle slot or a downlink slot after the last signal transmission slot of the wireless communication signal.

\* \* \* \* \*

34